US012022308B2

(12) United States Patent
Newbury et al.

(10) Patent No.: US 12,022,308 B2
(45) Date of Patent: Jun. 25, 2024

(54) SYSTEMS AND METHODS FOR DETERMINING A MASSIVE MULTIPLE-INPUT AND MULTIPLE-OUTPUT CONFIGURATION FOR TRANSMITTING DATA

(71) Applicant: Verizon Patent and Licensing Inc., Basking Ridge, NJ (US)

(72) Inventors: Mark Ernest Newbury, Hillsborough, NJ (US); Chin Chiu, Allen, TX (US); Jack Anthony Smith, Melissa, TX (US); Sachin Vargantwar, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 255 days.

(21) Appl. No.: 17/450,792

(22) Filed: Oct. 13, 2021

(65) Prior Publication Data
US 2023/0112639 A1    Apr. 13, 2023

(51) Int. Cl.
*H04W 24/08* (2009.01)
*H04B 7/0413* (2017.01)
*H04L 5/00* (2006.01)

(52) U.S. Cl.
CPC .......... *H04W 24/08* (2013.01); *H04B 7/0413* (2013.01); *H04L 5/0048* (2013.01)

(58) Field of Classification Search
CPC .... H04W 24/08; H04W 76/10; H04B 7/0413; H04B 17/336; H04B 7/0417; H04B 7/0626; H04L 5/0048; H04L 5/0051; H04L 1/0009
See application file for complete search history.

(56) References Cited

U.S. PATENT DOCUMENTS

| | | | | |
|---|---|---|---|---|
| 9,722,745 B2 * | 8/2017 | Mo | ............... | H04L 1/0009 |
| 2013/0242761 A1 * | 9/2013 | Park | ............... | H04L 43/08 |
| | | | | 370/252 |
| 2022/0085860 A1 * | 3/2022 | Bali | ............... | H04W 52/367 |
| 2022/0264584 A1 * | 8/2022 | Fan | ............... | H04L 5/0051 |
| 2023/0068844 A1 * | 3/2023 | Horn | ............... | H04W 76/10 |

FOREIGN PATENT DOCUMENTS

| | | | | | |
|---|---|---|---|---|---|
| CN | 113452481 A | * | 9/2021 | | |
| CN | 115706608 A | * | 2/2023 | | |
| EP | 3151448 A1 | * | 4/2017 | ............ | H04B 17/24 |
| WO | WO-2013185732 A2 | * | 12/2013 | ............ | H04B 1/0475 |
| WO | WO-2021087397 A1 | * | 5/2021 | ............ | H04B 7/0417 |

* cited by examiner

*Primary Examiner* — Ayaz R Sheikh
*Assistant Examiner* — Louis Samara

(57) ABSTRACT

In some implementations, a device may determine a signal to interference and noise ratio (SINR) value associated with a communication channel between a user equipment and the device. The device may select, based on the SINR value, a channel quality indicator (CQI) value associated with the communication channel or a sounding reference signal (SRS) from the UE to determine a multiple-input and multiple-output (MIMO) configuration for transmitting data to the UE. The device may determine the MIMO configuration according to the CQI value based on the SINR value being a first value. The device may determine the MIMO configuration according to the SRS based on the SINR value being a second value that is different than the first value. The device may transmit the data to the UE using the MIMO configuration.

20 Claims, 8 Drawing Sheets

SYSTEMS AND METHODS FOR DETERMINING A MASSIVE MULTIPLE-INPUT AND MULTIPLE-OUTPUT CONFIGURATION FOR TRANSMITTING DATA

BACKGROUND

Fifth generation (5G) telecommunication networks provide services at ultra-high speeds and ultra-low latencies. In order to achieve such ultra-high speeds and ultra-low latencies, 5G networks may utilize technologies such as multiple-input and multiple-output (MIMO), beamforming, wider channels, among other examples.

DETAILED DESCRIPTION OF PREFERRED EMBODIMENTS

Figure 1A:
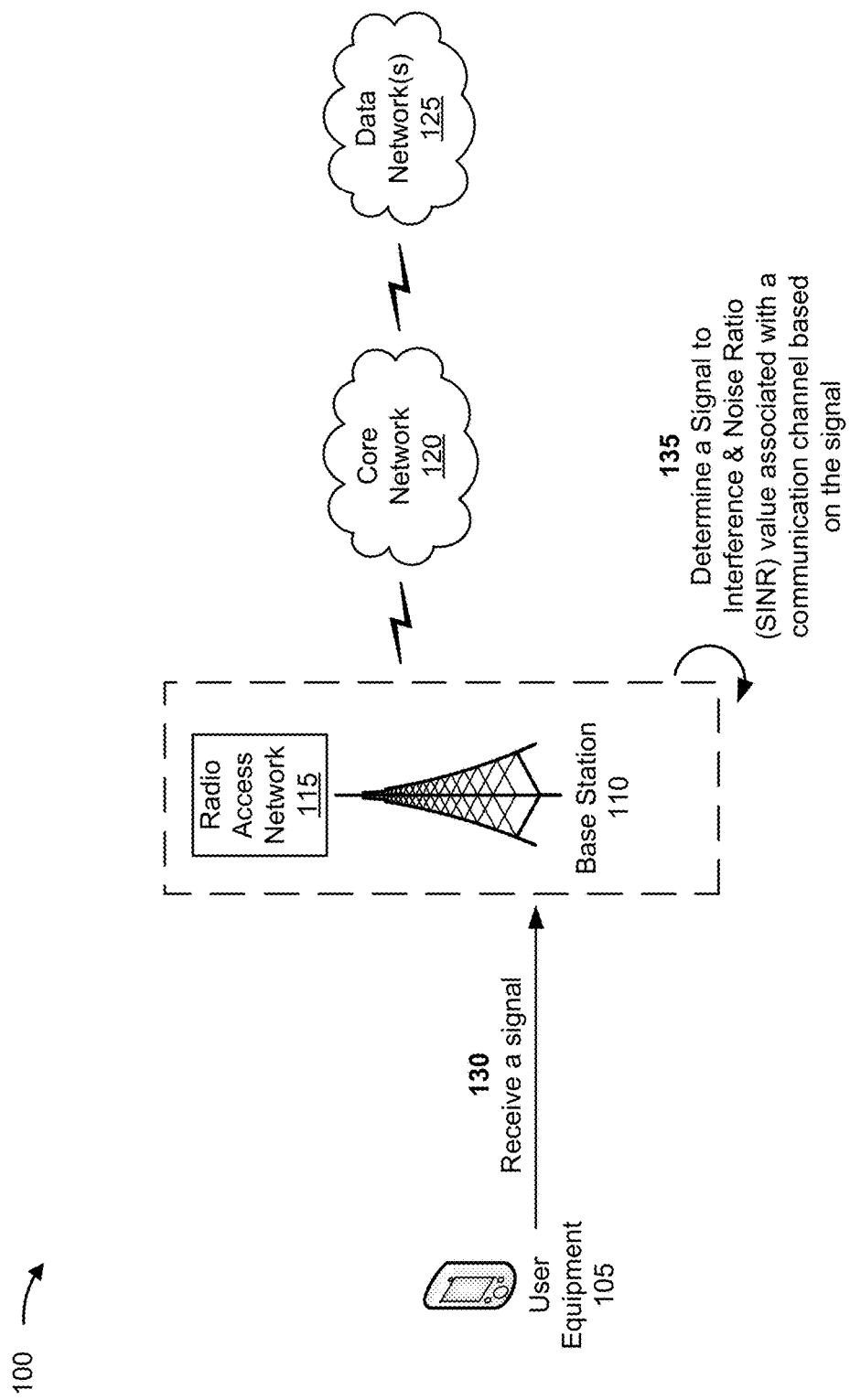
FIGS. 1A-1E are diagrams of an example associated with determining a MIMO configuration for transmitting data.

The following detailed description of example implementations refers to the accompanying drawings. The same reference numbers in different drawings may identify the same or similar elements.

5G telecommunication networks seek to provide high-speed, high-capacity services at low latencies by utilizing technologies such as multiple-input and multiple-output (MIMO), beamforming, wider channels, among other examples. MIMO provides a way to combine tens, hundreds, or more antennas into a single base station. The practical implication of MIMO is that a user equipment (UE) that previously used one transmitting and receiving channel may now use up to hundreds of channels. MIMO may be implemented to increase bandwidth, mitigate propagation errors, and/or optimize wireless range.

A base station may transmit and receive data using a MIMO configuration (e.g., a configuration that uses multiple antennas to transmit and receive data). The base station may use the MIMO configuration to transmit multiple layers of data over the same number of resources based on radio frequency conditions associated with the UE. The use of multiple antennas, via the MIMO configuration, may improve the quality and reliability of wireless links by facilitating the transmission and/or reception of different versions of the same data signal via multipath propagation.

In order for the base station to optimally use the multiple antennas to transmit and receive data, it must obtain knowledge regarding a channel that connects each transmit antenna at the base station with each receive antennas at the UE. Typically, there are two ways in which the base station can obtain this knowledge. The first is through direct measurement of sounding reference signals (SRSs) that are transmitted by the UE.

Using this SRS-based methodology, the UE would periodically transmit a sounding reference signal (SRS) using a bandwidth of interest. This SRS is designed in such a way that the base station can easily use the SRS to measure a channel impulse response and ultimately determine a channel transfer function that essentially describes how a signal transmitted from each transmit antenna will be impacted (gain and phase delay) as the signal travels to each receive antenna at a particular frequency of interest. Once the base station has this information, it can then determine the best signal to transmit from each transmit antenna.

Alternatively, the base station may determine the MIMO configuration based on channel quality indicator (CQI) feedback received from the UE in response to a channel strength indicator (CSI) reference signal (RS) transmitted to the UE. Using this methodology, a receiver (e.g., the UE) will measure the CSI reference signal independently on each of it's receive antennas. This will provide the receiver with a channel transfer function similar to that described during the SRS methodology. However, rather than sending this channel transfer function back to a transmitter (e.g., the base station), the UE will mathematically apply a number of candidate MIMO transmission hypothesis that were agreed upon in advance with the base station and determine which one provides the greatest link performance.

The UE will then send information back to the base station identifying which pre-agreed MIMO configuration produced the best performance. This information sent back is known commonly as CQI feedback, and it typically includes a precoding matrix indicator (PMI) or other indication that conveys to the base station a preferred mapping of signals to the multiple transmit antennas, a rank indication (RI) which typically indicates the number of parallel messages that can be transmitted over the air interface, and a channel quality indicator (CQI) that typically conveys to the base station the expected radio link performance that would result from the use of that PMI.

Sometimes CQI and CSI are used interchangeably, with both referring to the feedback of channel information that was measured at the UE and reported back to the base station. For the remainder of this document, we will use CQI value as a term that includes all necessary information (RI, CQI, and PMI) that is necessary to configure a MIMO transmission.

In practice, SRS measurement and CQI feedback have traditionally been used for different use cases. For instance, because of differences in uplink and downlink channels when a system is using frequency-division multiplexing (FDM), the channel cannot be measured at the base station and must be measured at the receiver, and hence, only CQI feedback is used in FDM systems with respect to obtaining information for downlink-directed transmissions. In systems employing time-division multiplexing (TDM), either SRS-based or CQI-based techniques can be used since the uplink and downlink channels are identical. In practice, it is up to a manufacturer of the base station to determine when and how to use each of the different methods. One key point of consideration is overhead.

A UE performing SRS-based sounding will typically consume a much-higher percentage of available uplink resources than a UE performing CQI-based feedback. Because of this, and also because most of the available channel resources are typically allocated to the downlink which compounds the need to conserve uplink resources, CQI-based feedback is commonly used for TDM too, especially when the system load is high. The primary exceptions are in cases where multi-user MIMO (MU-MIMO) is being used or when the UE is in extremely good channel conditions and high-performance precoding techniques can be used. MU-MIMO refers to the case where signals are transmitted simultaneously to two different users using the exact same resources.

Implementations described herein are directed to selectively using the CQI value or the SRS to determine the MIMO configuration. The MIMO configuration may include information regarding a quantity of antennas to be used to transmit and receive data, information regarding a direction of beams of the antennas, other information regarding beamforming associated with the antennas, among other examples. As part of determining the MIMO configuration, a base station may determine a signal to interference and noise ratio (SINR) value associated with a communication channel between the UE and the base station. The base station may use the SINR value to determine whether to use the CQI value to determine the MIMO configuration or use the SRS to determine the MIMO configuration.

In some implementations, the base station may determine whether to use the CQI value (e.g., use a precoder associated with the CQI based on the PMI) or use the SRS (e.g., use the SRS to derive a precoder) based on a SINR threshold. For example, the base station may use the CQI value when the SINR value does not satisfy the SINR threshold or use the SRS when the SINR value satisfies the SINR threshold. In other words, a MIMO beamforming (e.g., associated with the base station) may use the precoder associated with the CQI when the SINR value does not satisfy the SINR threshold or may use the SRS to derive the precoder when the SINR value satisfies the SINR threshold, for beamforming. Alternatively, the base station may determine whether to use the CQI value or the SRS based on a range of SINR values. For example, the base station may use the CQI value when the SINR value is less than a lowest value of the range of SINR values and use the SRS when the SINR value exceeds a highest value of the range of SINR values.

In some implementations, the base station may periodically determine the SINR value associated with the communication channel and, accordingly, periodically determine whether to use the CQI value or the SRS to determine the MIMO configuration based on the SINR value. The base station 110 may determine the MIMO configuration, as described herein, for a single UE or a plurality of UEs.

By determining whether to use the CQI value or the SRS to determine the MIMO configuration based on the SINR value, the base station may take into consideration the radio frequency conditions associated with the communication channel and may minimize or eliminate loss of signal, increased noise, increased interference, among other examples that negatively affect signals transmitted by the base station and received by the UE.

In some implementations, the base station may determine a precoder that is to be used by a MIMO beamforming. The precoder may be a CQI precoder or a precoder derived from SRS. A threshold may be determined based on a geometry of the UE (e.g., SINR). The threshold may be used to determine whether to use a SRS method (e.g., the CQI precoder) or a CQI method (e.g., the precoder derived from SRS).

In some examples, the threshold may be a fixed threshold. The fixed threshold may be adapted to optimize the value for a specific environment. In some situations, the fixed threshold may be adjusted using a filtered Outer Loop Link Adaptation (OLLA)-adjusted value. The OLLA-adjusted value may be captured by the base station over time. A hysteresis value may be used to prevent a ping pong effect of using CQI/SRS reporting.

FIGS. 1A-1E are diagrams of an example 100 associated with determining a MIMO configuration for transmitting data. As shown in FIG. 1A, example 100 includes a user equipment (UE) 105, a base station 110, a radio access network (RAN) 115, a core network 120, and one or more data networks 125 (referred to individually as "data network 125" and collectively as "data networks 125"). Example 100 illustrates various portions of a wireless telecommunications system (referred to herein as a "wireless network"). The wireless network may be a 5G wireless telecommunications system, a 4G wireless telecommunications system, a long-term evolution (LTE) wireless telecommunications system, an LTE-Advanced (LTE-A) wireless telecommunications system, among other examples. UE 105, base station 110, RAN 115, core network 120, and data networks 125 are described in more detail below in connection with FIGS. 2 and 3.

In some examples, UE 105 may be wirelessly connected to RAN 115 at base station 110. Base station 110 may be connected to data network 125 via core network 120. In the example that follows, UE 105 may be executing an application that involves communicating with core network 120 and/or data network 125. Accordingly, UE 105 may be requesting to establish a communication session (e.g., a protocol data unit (PDU) session) with core network 120 and/or with data network 125 via RAN 115.

As shown in FIG. 1A, and by reference number 130, base station 110 may receive a signal. For example, base station 110 may receive the signal from UE 105. In some implementations, base station 110 may receive the signal as part of a process to establish the communication session. For example, UE 105 may provide the signal to establish the communication session with core network 120 and/or data network 125, and base station 110 may receive the signal from UE 105.

In some implementations, base station 110 may receive the signal from UE 105 based on a trigger. For example, base station 110 may provide a request for the signal to UE 105 and base station 110 may receive the signal based on providing the request for the signal. For instance, base station 110 may provide the request as part of a process for determining the MIMO configuration for the communication session.

Additionally, or alternatively, to receiving the signal from UE 105 based on the trigger, base station 110 may receive the signal periodically (e.g., every thirty seconds, every minute, every two minutes, among other examples). In some implementations, a frequency for receiving the signal may be determined by a network operator associated with base station 110. In some examples, base station 110 may provide instructions to UE 105 to provide the signal periodically.

As shown in FIG. 1A, and by reference number 135, base station 110 may determine a SINR value associated with a communication channel based on the signal. For example, the communication channel may be between base station 110 and UE 105 and base station 110 may receive the signal via the communication channel. In some implementations, the signal may include an SINR value associated with the communication channel. For example, the request for the signal (provided by base station 110 to UE 105) may include an instruction to cause UE 105 to measure the SINR value and provide the SINR value to base station 110.

In some implementations, UE 105 may be pre-configured to measure SINR values and provide the SINR values to base station 110. In other words, UE 105 may be configured to provide SINR values to base station 110 without any request for the SINR values from base station 110. Base station 110 may determine the SINR value associated with the communication channel as the SINR value included in the signal received base station 110.

Figure 1B:
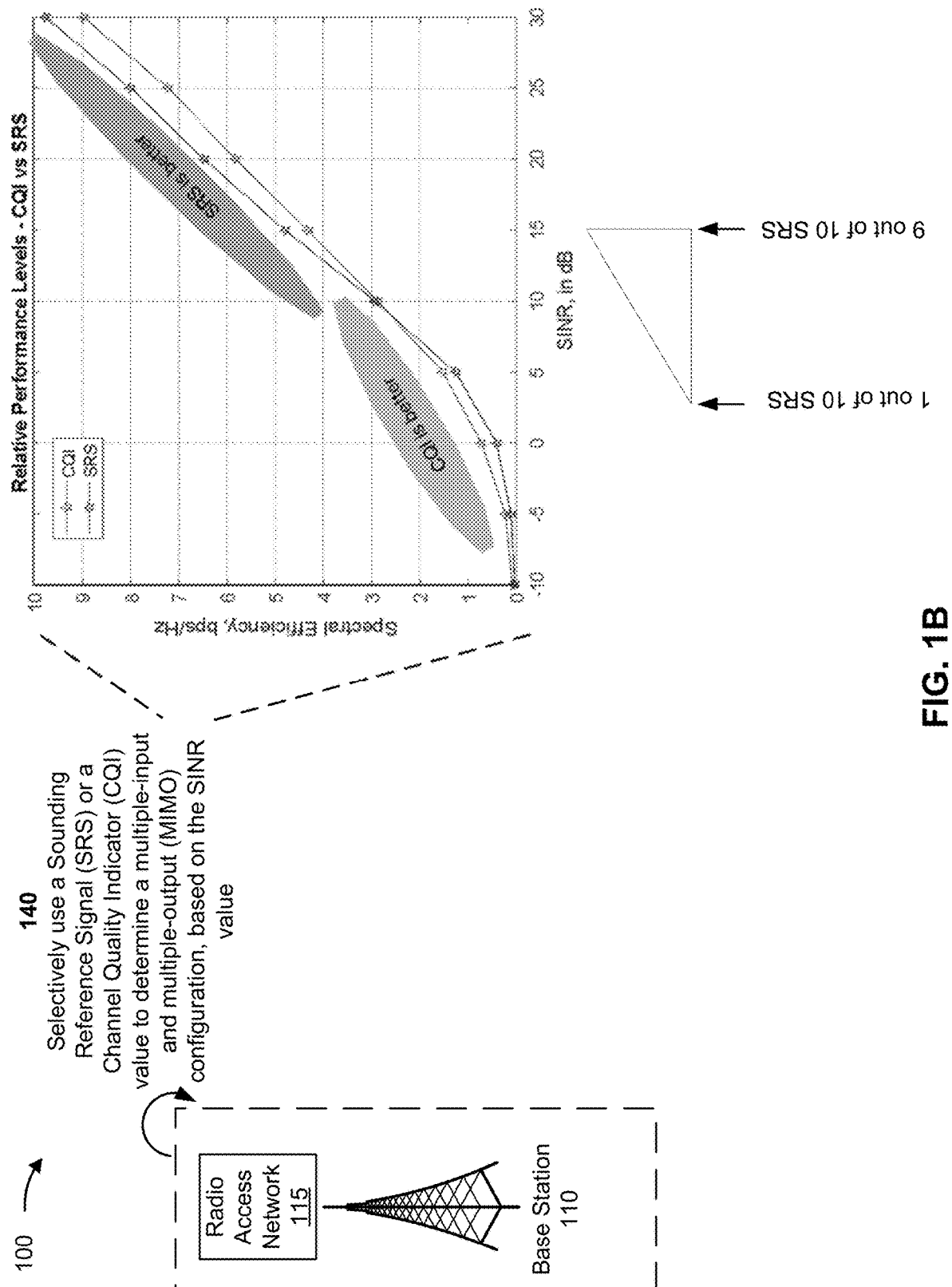

As shown in FIG. 1B, and by reference number 140, base station 110 may selectively use a SRS or a CQI value to determine the MIMO configuration, based on the SINR value. Base station 110 may be configured to determine the MIMO configuration for the communication session. For example, base station 110 may be configured to determine a quantity of antennas (e.g., of base station 110) to use for transmitting and receiving data as part of the communication session. Base station 110 may use the SINR value to determine whether the MIMO configuration is to be determined based on a SRS from UE 105 or whether the MIMO configuration is to be determined based on a CQI value (from UE 105) associated with the communication channel, as explained in more detail below.

In some implementations, base station 110 may determine a SINR threshold. Base station 110 may use the SINR threshold to determine whether the MIMO configuration is to be determined based on the SRS from UE 105 or based on the CQI value associated with the communication channel. In some situations, base station 110 may determine the SINR threshold based on historical data regarding data transmission via the communication channel. The historical data may include data that may be used to determine a measure of spectral efficiency (regarding the data transmission) associated with different SINR values associated with the communication channel.

In some examples, the historical data may include historical SINR values associated with the communication channel, historical measure of noise associated with the communication channel, historical measure of interference associated with the communication channel, historical measure of loss of signal associated with the communication channel, historical data regarding phases of antennas associated with the communication channel, historical information regarding environmental factors that may cause signals from base station 110 to be reflected, historical amounts of reflections by the environmental factors, historical measure of spectral efficiency associated with using CQI values to determine MIMO configurations for the communication channel, historical measure of spectral efficiency associated with using SRS to determine MIMO configurations for the communication channel, among other examples. The environmental factors may include buildings, water towers, trees, among other examples of factors that may affect a measure of signal quality and a measure of signal strength.

The historical data may be obtained by base station 110, obtained by another base station associated with core network 120, by another device associated with core network 120, among other examples. In some situations, the historical data may include similar data associated with different communication channels between base station 110 and UE 105 and/or between base station 110 and one or more other user equipment.

Based on the historical data, base station 110 may determine a measure of spectral efficiency associated with using CQI values to determine MIMO configurations for different SINR values. Additionally, base station 110 may determine a measure of spectral efficiency associated with using SRS to determine MIMO configurations for different SINR values. For example, as shown in FIG. 1B, base station 110 may determine that, with respect to SINR values that do not exceed approximately 8 decibels (dB), the measure of spectral efficiency associated with using CQI values exceeds the measure of spectral efficiency associated with using SRS.

Conversely, base station 110 may determine that, with respect to SINR values that exceed approximately 8 dB, the measure of spectral efficiency associated with using SRS exceeds the measure of spectral efficiency associated with using CQI values.

Based on the foregoing, base station 110 may determine that the SINR threshold is 8 dB. In this regard, base station 110 may determine to use the CQI value (from UE 105) to determine the MIMO configuration when the SINR value does not satisfy the SINR threshold. Alternatively, base station 110 may determine to use the SRS to determine the MIMO configuration when the SINR value satisfies the SINR threshold.

The base station could slowly adapt the SINR threshold of the switching point in order to optimize for a specific environment associated with the base station. The base station may use the filtered, (Outer Loop Link Adaptation) OLLA-adjusted value to determine the switching point, along with the use of a hysteresis value, in order to provide a small measure of ability to adapt to UE channel conditions. Typically, as UE 105 moves closer to base station 110, SINR values (measured by UE 105) increase. In this regard, as UE 105 moves closer to base station 110, base station 110 is able to obtain a more accurate measurement of characteristics associated with the communication channel (e.g., more accurate than similar measurements transmitted by UE 105 via another type of signal). Based on the more accurate measurement, base station 110 is able to more accurately determine an appropriate MIMO configuration to optimize a capacity of the communication channel. For example, base station 110 is able to determine information regarding appropriate precoding (or beamforming) for transmission of signals to UE 105. Such accurate measurement may be obtained by way of SRSs. Accordingly, as UE 105 moves closer to base station 110, base station 110 may cause UE 105 to transmit SRSs because UE 105 is better disposed to transmit SRSs when UE 105 is closer to base station 110. Based on the more accurate measurement associated with SRSs, base station 110 is able to more accurately determine an appropriate MIMO configuration, thereby enabling high performance beamforming.

Conversely, as UE 105 moves away from base station 110, SINR values (measured by UE 105) decrease. As UE 105 moves away from base station 110, the communication channel is subject to increased noise and interference. Accordingly, base station 110 causes UE 105 to determine (or estimate) information regarding precoding (or beamforming) for an appropriate MIMO configuration for the channel. The information regarding precoding is transmitted by UE 105 as CQI values. The information regarding precoding takes into consideration an average of noise associated with the communication channel that is not considered by SRSs. By taking into consideration the average of noise, mistakes with respect to beamforming and mistakes with respect to transmission power of UE 105 may be mitigated. The mistakes with respect to beamforming may include mistakes with respect to directions of beams. The mistakes with respect to the transmission power of UE 105 may refer to base station 110 erroneously transmitting a request to UE 105 for SRSs when UE 105 is not located within a distance threshold of base station 110. In this regard, due to a limited transmission power of UE 105, UE 105 may be unable to transmit SRSs when UE 105 is not within the distance threshold of base station 110.

Additionally, or alternatively, to determining whether to use the CQI value (e.g., use the precoder of the CQI for MIMO beamforming) or use the SRS (e.g., use the precoder derived from the SRS for MIMO beamforming) to determine the MIMO configuration (e.g., a quantity of antennas, a direction of beamforming of the antennas, and other beamforming configuration for the antennas) based on the SINR threshold, base station 110 may determine whether to use the CQI value or the SRS to determine the MIMO configuration based on a range of SINR values. In some examples, base station 110 may determine the range of SINR values based on the historical data. Additionally, or alternatively, base station 110 may determine the range of SINR values based on information received from a device of the network operator, from another base station, among other examples. The information may include information regarding the range of SINR values.

In some implementations, base station 110 may determine to use the CQI value (transmitted by UE 105) to determine the MIMO configuration when the SINR value does not exceed a lowest SINR value of the range of SINR values. Alternatively, base station 110 may determine to use the SRS (associated with the communication channel) to determine the MIMO configuration when the SINR value exceeds a highest SINR value of the range of SINR values.

Alternatively, base station 110 may determine to alternatively use the SRS and the CQI reported value to determine the MIMO configuration when the SINR value is included in the range of SINR values. In some situations, base station 110 may alternatively use the SRS and the CQI value based on a duty cycle.

The duty cycle would be based on a modified location within the SINR range or window.

Example: (Referring to FIG. 1B)

Outside of window left→[C, C, C, C, C, C, C, C, C, C]
As UE enters window from left side→[S, C, C, C, C, C, C, C, C, C]
After X dB increase, transition to→[S, C, C, C, C, S, C, C, C, C]
After another X dB increase, transition to→[S,S, C, C, C, S, C, C, C, C] and so on.
In the above example, C represents CQI reporting, and S represents SRS reporting.
A Separate OLLA value could be used for each reporting (e.g., each CQI reporting and/or each SRI reporting) and used to modify the location within the window:
Modified location=Actual location+SRS_OLLA−CQI_OLLA
The modified value allows the algorithm to adjust to each UE's channel conditions and favor whichever routine is working better.

As illustrated above, UE 105 may measure a SINR value and may alternatively use the SRS and the CQI value based on the SINR value. As UE 105 moves closer to base station 110, the SINR value (measured by UE 105) increases. As the SINR value increases, base station 110 may increase a frequency of using the SRS to determine the MIMO configuration. Conversely, as UE 105 moves away from base station 110, the SINR value (measured by UE 105) decreases. As the SINR value decreases, base station 110 may increase a frequency of using the CQI value to determine the MIMO configuration.

In some implementations, prior to determining to alternatively use the SRS and the CQI value to determine the MIMO configuration, base station 110 may adjust the SINR value when the SINR value is included in the range of SINR values. For example, base station 110 may adjust the SINR value using an outer loop link adaptation (OLLA) value associated with the CQI value and an OLLA value associated with the SRS. The SINR location can be adjusted by including the OLLA value associated with the SRS and the OLLA value associated with the CQI value.

As shown in FIG. 1B, for example, base station 110 may use the CQI value to determine the MIMO configuration more frequently when the SINR value is the lowest SINR value of the range of SINR values. Conversely, base station 110 may use the SRS to determine the MIMO configuration more frequently when the SINR value is the highest SINR value of the range of SINR values.

The SINR values, the measure of spectral efficiency associated with using CQI values, the measure of spectral efficiency associated with using SRS, the SINR threshold, and the range of SINR values are merely provided as examples. In practice, different SINR values, different measures of spectral efficiency associated with using CQI values, different measures of spectral efficiency associated with using SRS, a different SINR threshold, and different ranges of SINR values may be used in different situations. For example, the SINR threshold and the ranges of SINR values described above in connection with UE 105 may be different than a SINR threshold and the ranges of SINR values determined for another UE (e.g., based on historical data regarding a communication channel associated with the other UE).

Figure 1C:
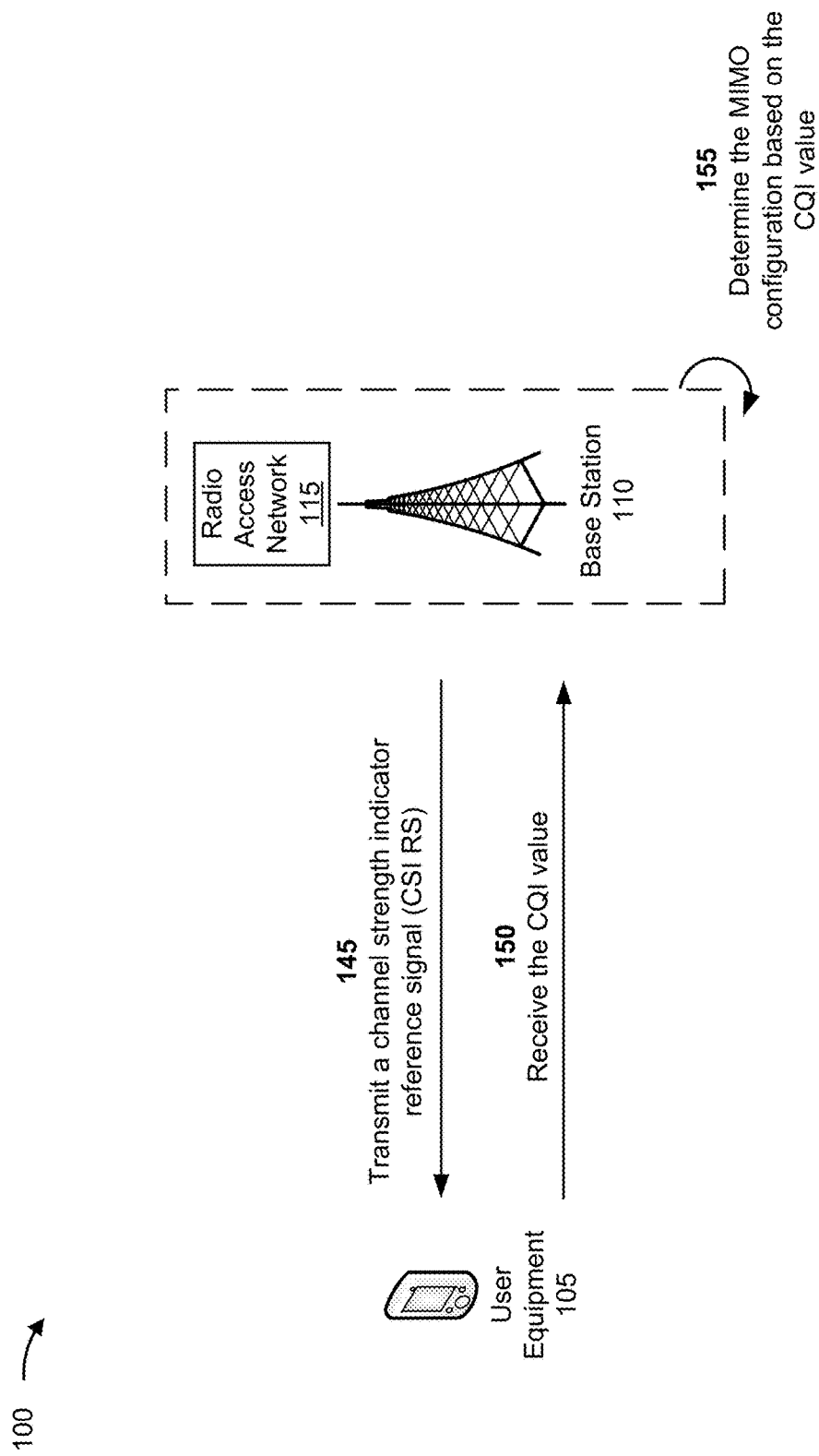

As shown in FIG. 1C, and by reference number 145, base station 110 may transmit a channel strength indicator reference signal (CSI RS). For example, assume base station 110 determines to use the CQI value to determine the MIMO configuration, as explained above. Based on determining to use the CQI value, base station 110 may transmit the CSI RS to UE 105. Base station 110 may transmit the CSI RS to UE 105 to cause UE 105 determine information regarding precoding (or beamforming) to be used for data transmitted by base station 110 via the communication channel. UE 105 may determine the information regarding the precoding and transmit the information as the CQI value.

As shown in FIG. 1C, and by reference number 150, base station 110 may receive the CQI value. For example, based on transmitting the CSI RS, base station 110 may receive the CQI value.

As shown in FIG. 1C, and by reference number 155, base station 110 may determine the MIMO configuration based on the CQI value. For example, base station 110 may use the CQI value (received from UE 105) to determine the MIMO configuration. For instance, base station 110 may determine the MIMO configuration based on the information regarding the precoding. As an example, based on the information regarding the precoding, base station 110 may determine a quantity of antennas, a direction of beamforming of the antennas, and other beamforming configuration for the antennas.

Figure 1D:
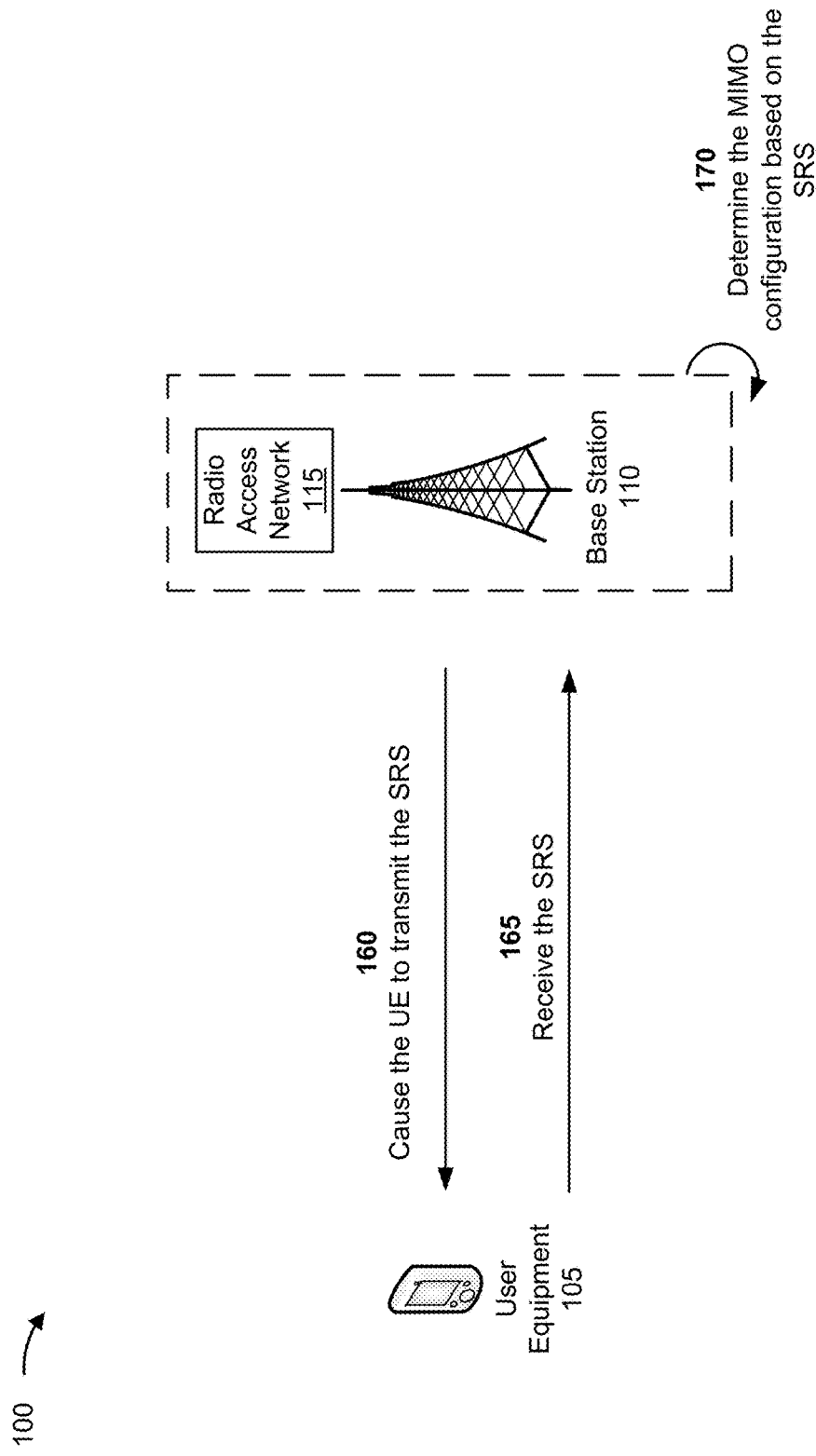

As shown in FIG. 1D, and by reference number 160, base station 110 may cause the UE to transmit the SRS. For example, assume base station 110 determines to use the SRS to determine the MIMO configuration, as explained above. Based on determining to use the SRS, base station 110 may transmit an SRS request to UE 105 to cause UE 105 transmit the SRS. Based on the SRS request, UE 105 may transmit the SRS to base station 110. The SRS may include information regarding more accurate measurement of characteristics associated with the communication channel (e.g., more accurate than similar measurements transmitted by UE 105 via another type of signal).

As shown in FIG. 1D, and by reference number 165, base station 110 may receive the SRS. For example, based on transmitting the SRS request, base station 110 may receive the SRS.

As shown in FIG. 1D, and by reference number 170, base station 110 may determine the MIMO configuration based on the SRS. For example, base station 110 may use the SRS (received from UE 105) to determine the MIMO configuration. For instance, base station 110 may determine the MIMO configuration based on the accurate measurement of characteristics associated with the communication channel. As an example, based on the accurate measurement of characteristics associated with the communication channel, base station 110 may determine a particular MIMO configuration (e.g., a quantity of antennas, a direction of beamforming of the antennas, and other beamforming configuration for the antennas).

Figure 1E:
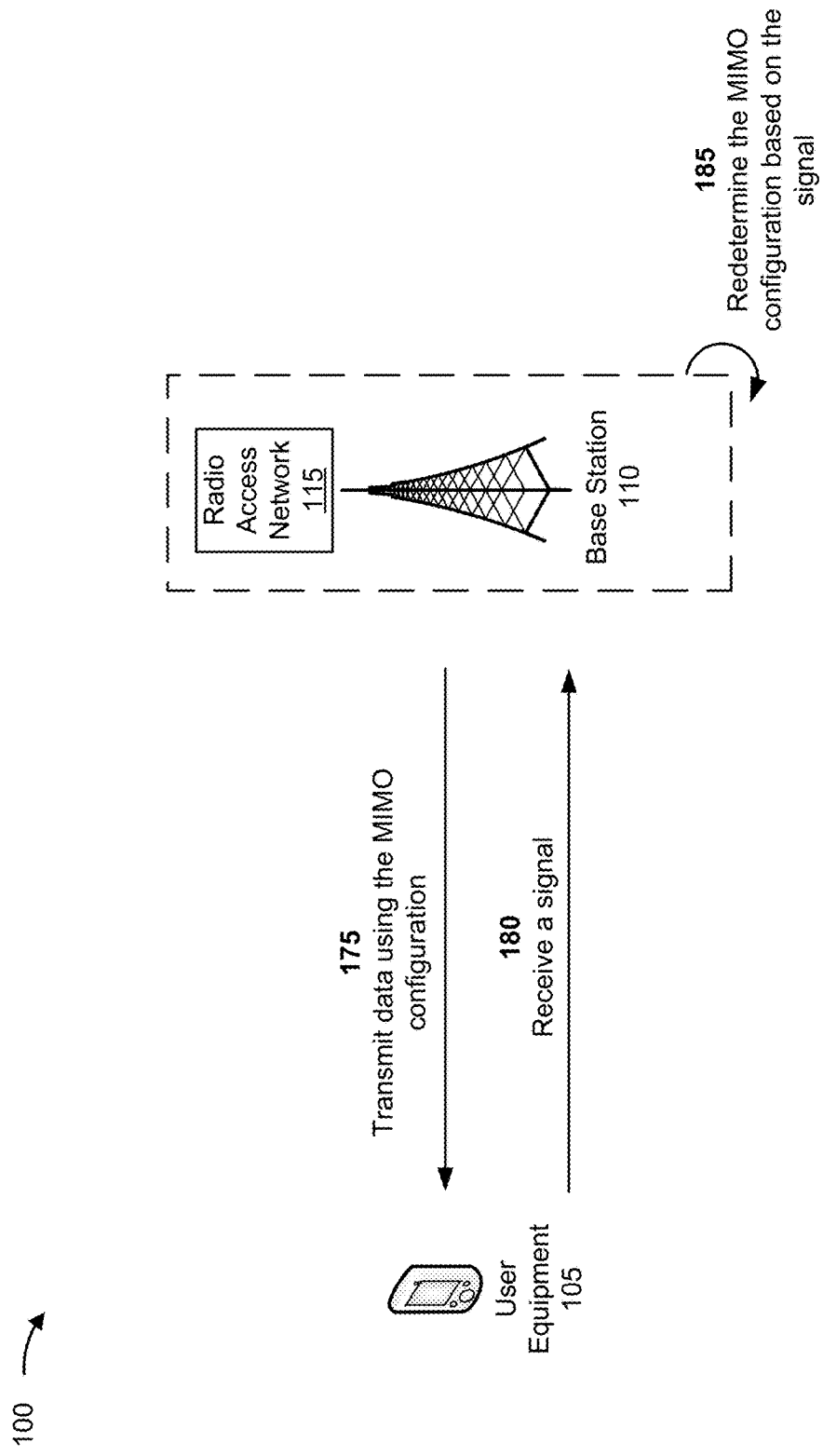

As shown in FIG. 1E, and by reference number 175, base station 110 may transmit data using the MIMO configuration. For example, after determining the MIMO configuration (based on the CQI value or based on the SRS), base station 110 may transmit data to UE 105 using the MIMO configuration. Base station 110 may transmit the data via the communication channel.

As shown in FIG. 1E, and by reference number 180, base station 110 may receive a signal. In some implementations, after transmitting the data using the MIMO configuration determined using one of the CQI value or the SRS, base station 110 may determine whether to switch to using another one of the CQI value or the SRS to redetermine the MIMO configuration. For example, after transmitting the data, base station 110 may transmit a request for the signal to UE 105 and, based on the request, may receive the signal from UE 105. Alternatively, UE 105 may provide the signal to base station 110 after receiving the data, without receiving the request from base station 110.

As shown in FIG. 1E, and by reference number 185, base station 110 may redetermine the MIMO configuration based on the signal. In some implementations, base station 110 may determine, based on the signal, information regarding one or more uplink activities associated with UE 105. For example, the signal may indicate that the application, being executed by UE 105, is an uplink intensive application. Additionally, or alternatively, the signal may indicate that UE 105 is communicating by way of an uplink carrier aggregation. Assume that the MIMO configuration was determined using the SRS. Based on determining that the application is an uplink intensive application and/or that UE 105 is communicating by way of an uplink carrier aggregation, base station 110 may redetermine the MIMO configuration using the CQI value. Base station 110 may transmit additional data to UE 105 using the redetermined MIMO configuration.

In some implementations, base station 110 may determine, based on the signal, a UE speed associated with UE 105. Base station 110 may determine that the UE speed does not satisfy a speed threshold. For base station 110 may determine that UE 105 is stationary or is moving slowly. Assume that the MIMO configuration was determined using the CQI value. Based on determining that the UE speed does not satisfy the speed threshold, base station 110 may redetermine the MIMO configuration using the SRS. Base station 110 may transmit additional data to UE 105 using the redetermined MIMO configuration.

In some implementations, base station 110 may determine, based on the signal, a transmission power value of a transmission power associated with UE 105. Base station 110 may determine that a CQI value is to be used to redetermine the MIMO configuration when the transmission power value does not satisfy a transmission power threshold. Alternatively, base station 110 may determine that an SRS is to be used to redetermine the MIMO configuration when the transmission power value satisfies the transmission power threshold. Base station 110 may transmit additional data to UE 105 using the redetermined MIMO configuration.

In some implementations, base station 110 may determine, based on the signal, a second SINR value. Assume that the MIMO configuration was determined using one of the CQI value or the SRS. Base station 110 may redetermine the MIMO configuration using another one of the CQI value or the SRS based on the second SINR value, in a manner similar to the manner described above.

By determining whether to use the CQI value or the SRS to determine the MIMO configuration based on the SINR value, the base station may take into consideration the radio frequency conditions associated with the communication channel and may minimize or eliminate loss of signal, increased noise, increased interference, among other examples that negatively affect signals transmitted by the base station and received by the UE.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
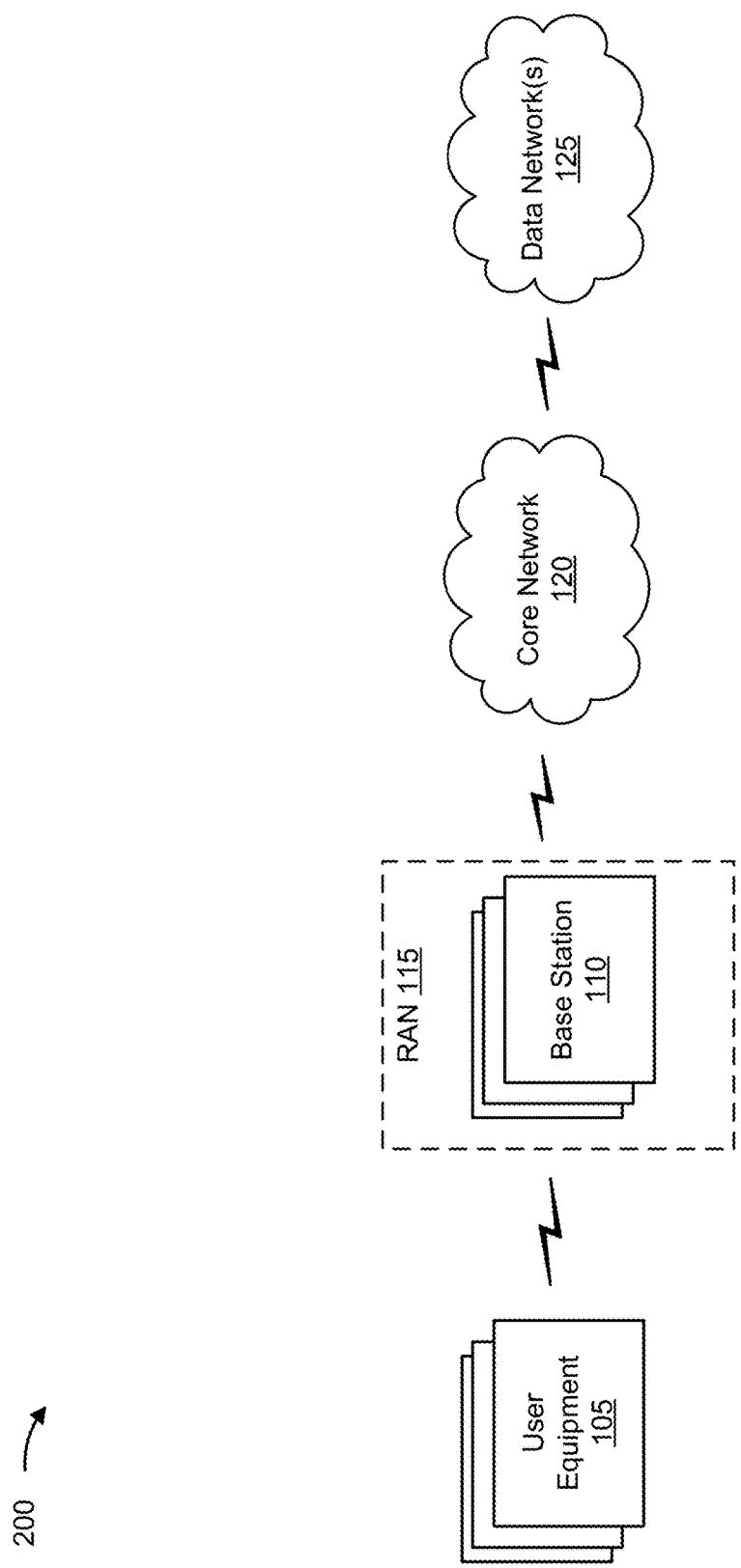
FIG. 2 is a diagram of an example environment in which systems and/or methods described herein may be implemented.
Figure 3:
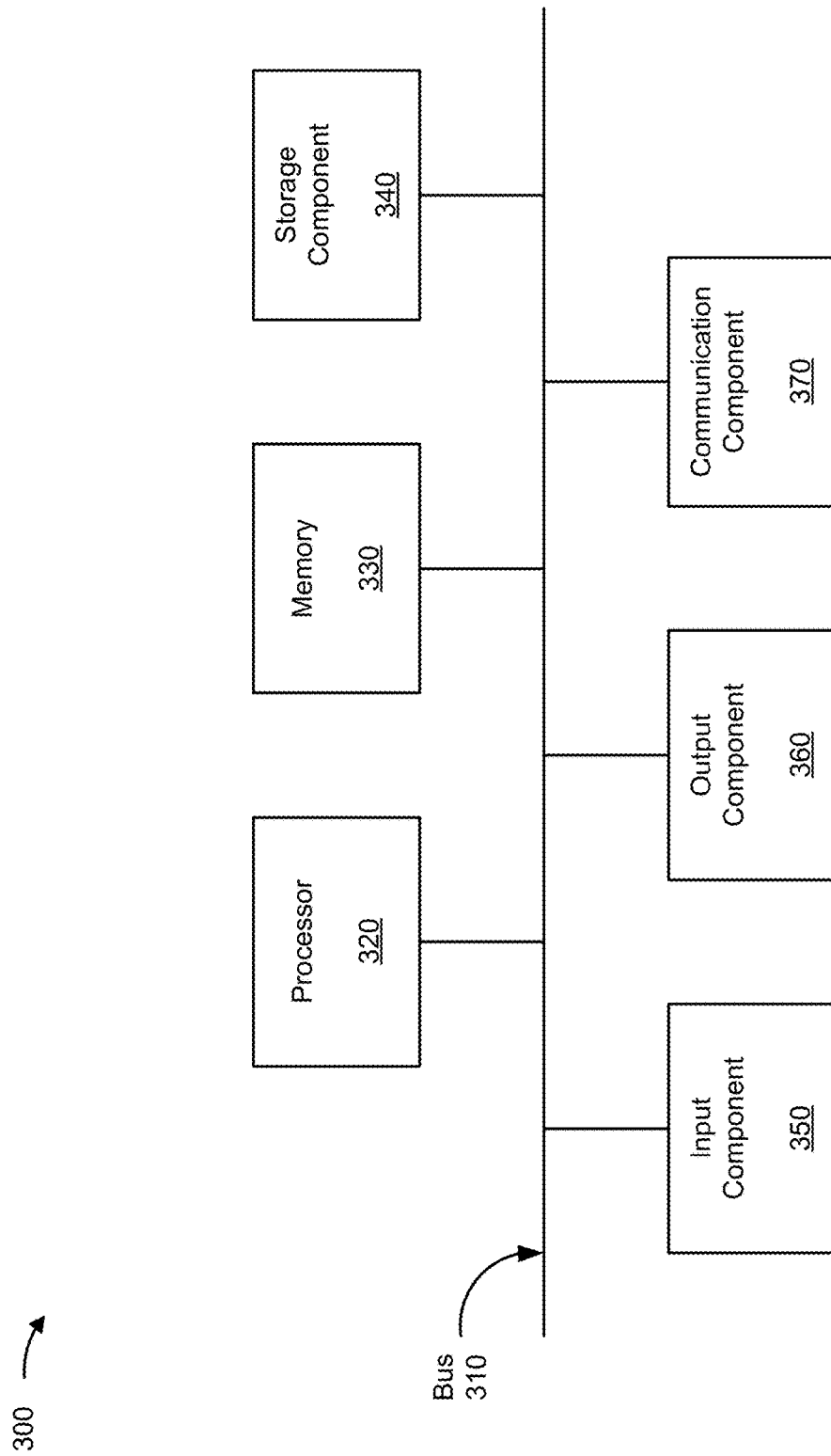
FIG. 3 is a diagram of example components of one or more devices of FIG. 2.

FIG. 2 is a diagram of an example environment 200 in which systems and/or methods, described herein, can be implemented. As shown in FIG. 3, environment 200 can include UE 105, base station 110, RAN 115, core network 120, and data network 125. Devices of environment 200 can interconnect via wired connections, wireless connections, or a combination of wired and wireless connections.

UE 105 includes one or more devices capable of communicating with RAN 115 and/or a data network 125 (e.g., via core network 120). For example, UE 105 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 105 can be capable of communicating using uplink (e.g., UE to RAN) communications, downlink (e.g., RAN to UE) communications, and/or sidelink (e.g., UE-to-UE) communications. In some implementations, UE 105 can include a machine-type communication (MTC) UE, such as an evolved or enhanced MTC (eMTC) UE. In some implementations, UE 105 can include an Internet of things (IoT) UE, such as a narrowband IoT (NB-IoT) UE, among other examples.

RAN 115 includes one or more devices capable of communicating with UE 105 using a cellular radio access technology (RAT). For example, RAN 115 can include a base station 110, a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 110 has the same characteristics and functionality of RAN 115, and vice versa. RAN 115 can transfer traffic between UE 105 (e.g., using a cellular RAT), one or more other RANs 115 (e.g., using a wireless interface or a backhaul interface, such as a wired backhaul interface), and/or core network 120. RAN 115 can provide one or more cells that cover geographic areas. Some RANs 115 can be mobile base stations. Some RANs 115 can be capable of communicating using multiple RATs.

In some implementations, RAN 115 can perform scheduling and/or resource management for UEs 105 covered by RAN 115 (e.g., UEs 105 covered by a cell provided by RAN 115). In some implementations, RAN 115 can be controlled or coordinated by a network controller, which can perform load balancing, network-level configuration, and/or the like. The network controller can communicate with RAN 115 via a wireless or wireline backhaul. In some implementations, RAN 115 can include a network controller, a self-organizing network (SON) module or component, or a similar module or component. In other words, RAN 115 can perform network control, scheduling, and/or network management functions (e.g., for other RAN 115 and/or for uplink, downlink, and/or sidelink communications of UEs 105 covered by RAN 115). In some implementations, RAN 115 can apply network slice policies to perform the network control, scheduling, and/or network management functions. In some implementations, RAN 115 can include a central unit and multiple distributed units. The central unit can coordinate access control and communication with regard to the multiple distributed units. The multiple distributed units can provide UEs 105 and/or other RANs 115 with access to data network 125 via core network 120.

Core network 120 includes various types of core network architectures, such as a 5G Next Generation (NG) Core, an LTE Evolved Packet Core (EPC), among other examples. In some implementations, core network 120 can be implemented on physical devices, such as a gateway, a mobility management entity, among other examples. In some implementations, the hardware and/or software implementing core network 120 can be virtualized (e.g., through the use of network function virtualization and/or software-defined networking), thereby allowing for the use of composable infrastructure when implementing core network 120. In this way, networking, storage, and compute resources can be allocated to implement the functions of core network 120 in a flexible manner as opposed to relying on dedicated hardware and software to implement these functions.

Data network 125 includes one or more wired and/or wireless data networks. For example, data network 125 can include an Internet Protocol (IP) Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, or an operator services network, among other examples, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

FIG. 3 is a diagram of example components of a device 300, which may correspond to UE 105 and/or base station 110. In some implementations, UE 105 and/or base station 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
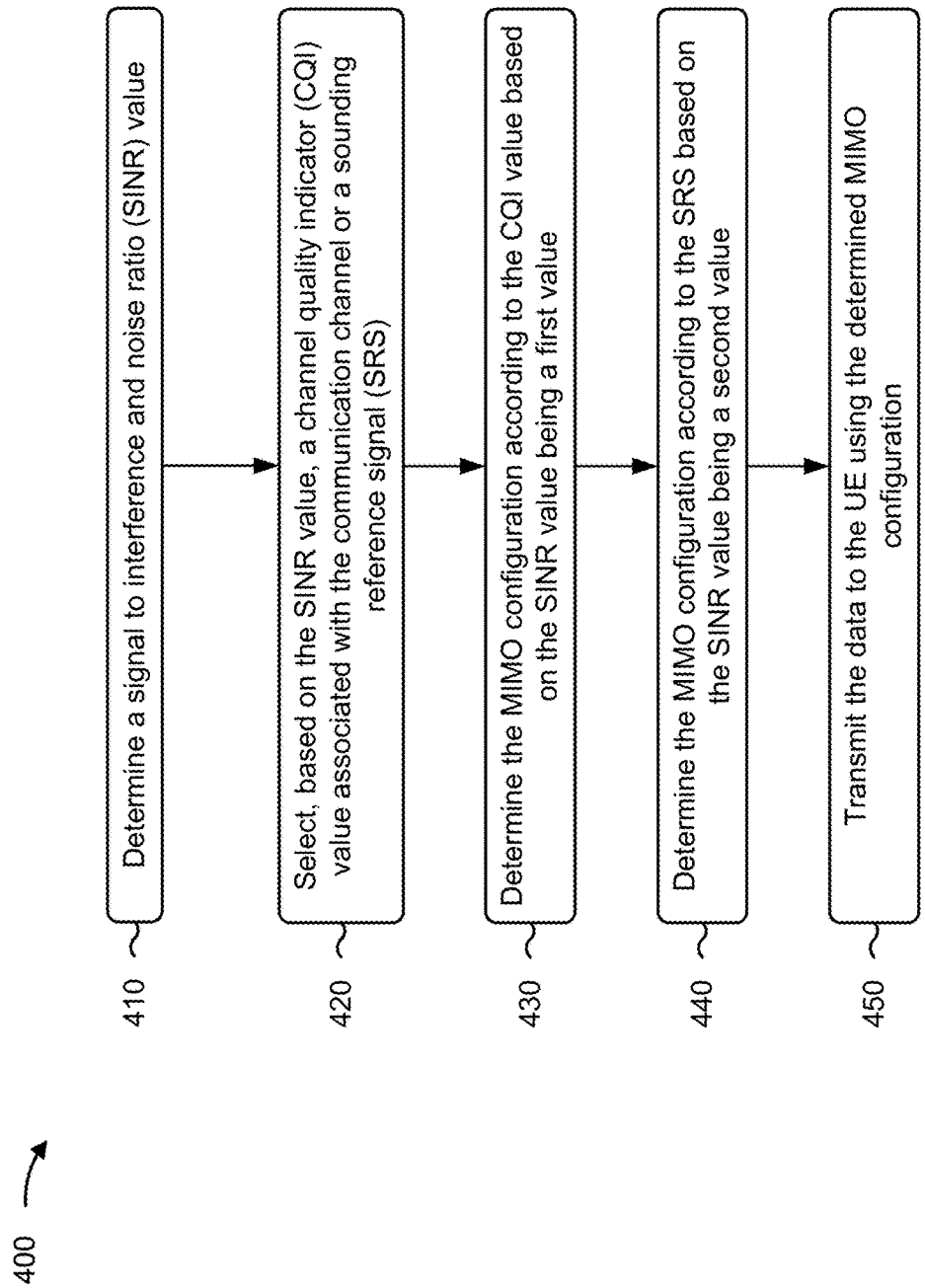
FIG. 4 is a flowchart of an example process relating to determining a MIMO configuration for transmitting data.

FIG. 4 is a flowchart of an example process 400 relating to determining a MIMO configuration for transmitting data. In some implementations, one or more process blocks of FIG. 4 may be performed by a base station (e.g., base station 110). In some implementations, one or more process blocks of FIG. 4 may be performed by another device or a group of devices separate from or including the base station, such as a UE (e.g., UE 105). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining a signal to interference and noise ratio (SINR) value associated with a communication channel between a user equipment and the device (block 410). For example, the base station may determine a signal to interference and noise ratio (SINR) value associated with a communication channel between a user equipment and the device, as described above.

As further shown in FIG. 4, process 400 may include selecting, based on the SINR value, a channel quality indicator (CQI) value associated with the communication channel or a sounding reference signal (SRS) from the UE to determine a multiple-input and multiple-output (MIMO) configuration for transmitting data to the UE (block 420). For example, the base station may select, based on the SINR value, a channel quality indicator (CQI) value associated with the communication channel or a sounding reference signal (SRS) from the UE to determine a multiple-input and multiple-output (MIMO) configuration for transmitting data to the UE. In some implementations, the SRS is used to determine the MIMO configuration based on the SINR value being a second value that is different than the first value.

In some implementations, process 400 includes determining a SINR threshold, and selectively using the CQI value or the SRS comprises using the CQI value to determine the MIMO configuration based on the SINR value not satisfying the SINR threshold, and using the SRS to determine the MIMO configuration based on the SINR value satisfying the SINR threshold.

In some implementations, determining the SINR threshold comprises determining historical data regarding data transmission via the communication channel, and determining the SINR threshold based on the historical data regarding the data transmission via the communication channel.

In some implementations, process 400 includes determining a range of SINR values, and selectively using the SRS or the CQI value comprises using the CQI value to determine the MIMO configuration based on the SINR value not exceeding a lowest SINR value of the range of SINR values, and using the SRS to determine the MIMO configuration based on the SINR value exceeding a highest SINR value of the range of SINR values.

In some implementations, selectively using the SRS or the CQI value comprises alternatively using the SRS and the CQI value to determine the MIMO configuration based on the SINR value being included in the range of SINR values.

As further shown in FIG. 4, process 400 may include determining the MIMO configuration according to the CQI value based on the SINR value being a first value (block 430). For example, the device may determine the MIMO configuration according to the CQI value based on the SINR value being a first value, as described above.

As further shown in FIG. 4, process 400 may include determining the MIMO configuration according to the SRS based on the SINR value being a second value that is different than the first value (block 440). For example, the device may determine the MIMO configuration according to the SRS based on the SINR value being a second value that is different than the first value, as described above.

As further shown in FIG. 4, process 400 may include transmitting the data to the UE using the MIMO configuration (block 450). For example, the base station may transmit the data to the UE using the MIMO configuration, as described above.

In some implementations, process 400 includes determining, after transmitting the data to the UE, a transmission power value of a transmission power associated with the UE, and selectively using the CQI value or the SRS to redetermine the MIMO configuration, based on the transmission power value, wherein the CQI value is used to redetermine the MIMO configuration based on the transmission power value not satisfying a transmission power threshold, and wherein the SRS is used to redetermine the MIMO configuration based on the transmission power value satisfying the transmission power threshold, and transmitting additional data to the UE using the redetermined MIMO configuration.

In some implementations, the MIMO configuration is determined using one of the CQI value or the SRS, wherein the SINR value is a first SINR value, and wherein the method further comprises receiving a signal from the UE after transmitting the data to the UE, determining a second SINR value based on the signal, and redetermining the MIMO configuration using another one of the CQI value or the SRS based on the second SINR value.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a device, comprising:
determining a signal to interference and noise ratio (SINR) value associated with a communication channel between a user equipment and the device;
selecting, based on the SINR value, a channel quality indicator (CQI) value associated with the communication channel or a sounding reference signal (SRS) from the UE to determine a multiple-input and multiple-output (MIMO) configuration for transmitting data to the UE;
determining the MIMO configuration according to the CQI value based on the SINR value being a first value; and
determining the MIMO configuration according to the SRS based on the SINR value being a second value that is different than the first value; and
transmitting the data to the UE using the determined MIMO configuration.

2. The method of claim 1, further comprising:
determining a SINR threshold,
wherein determining the SINR threshold comprises:
determining historical data regarding data transmission via the communication channel, and
determining the SINR threshold based on the historical data regarding the data transmission via the communication channel.

3. The method of claim 1, further comprising:
determining that the SINR value is included in a range of SINR values; and
adjusting the SINR value using an outer loop link adaptation (OLLA) value associated with the CQI value and an OLLA value associated with the SRS, based on determining that the SINR value is included in the range of SINR values,
wherein the CQI value or the sounding reference signal (SRS) is selected, based on the adjusted SINR value, to determine the MIMO configuration.

4. The method of claim 1, further comprising:
determining, after transmitting the data to the UE, a transmission power value of a transmission power associated with the UE;
redetermining the MIMO configuration, using the CQI value, based on the transmission power value not satisfying a transmission power threshold;
redetermining the MIMO configuration, using the SRS, based on the transmission power value satisfying the transmission power threshold; and
transmitting additional data to the UE using the redetermined MIMO configuration.

5. The method of claim 1, further comprising:
determining a range of SINR values;
determining the MIMO configuration, using the CQI value, based on the SINR value not exceeding a lowest SINR value of the range of SINR values; and
determining the MIMO configuration, using the SRS, based on the SINR value exceeding a highest SINR value of the range of SINR values.

6. The method of claim 5, wherein selectively using the SRS or the CQI value comprises:
alternatively using the SRS and the CQI value to determine the MIMO configuration based on the SINR value being included in the range of SINR values.

7. The method of claim 1, wherein the MIMO configuration is determined using one of the CQI value or the SRS;
wherein the SINR value is a first SINR value; and
wherein the method further comprises:
receiving a signal from the UE after transmitting the data to the UE;
determining a second SINR value based on the signal; and
redetermining the MIMO configuration using another one of the CQI value or the SRS based on the second SINR value.

8. A device, comprising:
one or more processors configured to:
determine a signal to interference and noise ratio (SINR) value associated with a communication channel between a user equipment (UE) and the device;

use a channel quality indicator (CQI) value, associated with the communication channel, to determine a multiple-input and multiple-output (MIMO) configuration for communicating with the UE,
   wherein the CQI value is used based on the SINR value not exceeding a lowest SINR value of a range of SINR values;
use a sounding reference signal (SRS) from the UE to determine the MIMO configuration for communicating with the UE,
   wherein the SRS is used based on the SINR value exceeding a highest SINR value of the range of SINR values; and
transmit data to the UE using the MIMO configuration.

9. The device of claim 8, wherein the one or more processors are further configured to:
   determine that the SINR value is included in the range of SINR values;
   adjust the SINR value using an outer loop link adaptation (OLLA) value associated with the CQI value and an OLLA value associated with the SRS, based on determining that the SINR value is included in the range of SINR values; and
   wherein the one or more processors are configured to:
      selectively use the CQI value or the SRS based on the adjusted SINR value.

10. The device of claim 9, wherein the one or more processors are configured to:
   use the CQI value to determine the MIMO configuration based on the adjusted SINR value not exceeding the lowest SINR value of the of SINR values;
   use the SRS to determine the MIMO configuration based on the adjusted SINR value exceeding the highest SINR value of the of SINR values; and
   alternatively use the SRS and the CQI value to determine the MIMO configuration based on the adjusted SINR value being included in the range of SINR values.

11. The device of claim 8, wherein the MIMO configuration is determined using the SRS; and
   wherein the one or more processors are further configured to:
      receive a signal from the UE after transmitting the data to the UE;
      determine, based on the signal, information regarding one or more uplink activities associated with the UE;
      redetermine the MIMO configuration using the CQI value based on the information regarding the one or more uplink activities; and
      transmit additional data to the UE using the redetermined MIMO configuration.

12. The device of claim 8, wherein the MIMO configuration is determined using the CQI value; and
   wherein the one or more processors are further configured to:
      receive a signal from the UE after transmitting the data to the UE;
      determine, based on the signal, that a UE speed associated with the UE does not satisfy a speed threshold;
      redetermine the MIMO configuration using the SRS based on determining that the UE speed does not satisfy the speed threshold; and
      transmit additional data to the UE using the redetermined MIMO configuration.

13. The device of claim 8, wherein the one or more processors are further configured to:
   determine, after transmitting the data to the UE, a transmission power value of a transmission power associated with the UE;
   redetermine the MIMO configuration, using the CQI value, based on the transmission power value not satisfying a transmission power threshold;
   redetermine the MIMO configuration, using the SRS, based on the transmission power value satisfying the transmission power threshold; and
   transmit additional data to the UE using the redetermined MIMO configuration.

14. The device of claim 8, wherein the one or more processors are further configured to:
   alternatively use the SRS and the CQI value to determine the MIMO configuration based on the SINR value being included in the range of SINR values.

15. A non-transitory computer-readable medium storing a set of instructions, the set of instructions comprising:
   one or more instructions that, when executed by one or more processors of a device, cause the device to:
      determine a first signal to interference and noise ratio (SINR) value associated with a communication channel between a user equipment and the device;
      selectively use, based on the first SINR value, one of a first option or a second option to determine a multiple-input and multiple-output (MIMO) configuration for communicating with the UE,
         wherein the first option is associated with channel quality indicator (CQI) values that are associated with the communication channel, and
         wherein the second option is associated with sounding reference signals (SRSs) from the UE;
      transmit first data to the UE using the MIMO configuration;
      determine a second SINR value associated with the communication channel after transmitting the first data;
      selectively use, based on the second SINR value, another one of the first option or the second option to redetermine the MIMO configuration; and
      transmit second data to the UE using the redetermined MIMO configuration.

16. The non-transitory computer-readable medium of claim 15, wherein the one or more instructions, that cause the device to selectively use the one of the first option or the second option, cause the device to:
   use the first option to determine the MIMO configuration based on the first SINR value not satisfying a SINR threshold; and
   use the second option to determine the MIMO configuration based on the first SINR value satisfying the SINR threshold.

17. The non-transitory computer-readable medium of claim 16, wherein the one or more instructions, when executed by the one or more processors, further cause the device to:
   determine historical data regarding data transmission via the communication channel; and
   determine the SINR threshold based on the historical data.

18. The non-transitory computer-readable medium of claim 15, wherein the one or more instructions, that cause the device to selectively use the one of the first option or the second option, cause the device to:
   use the first option to determine the MIMO configuration based on the first SINR value not exceeding a lowest SINR value of a range of SINR values; and use the second option to determine the MIMO configuration based on the second SINR value exceeding a highest SINR value of the range of SINR values.

19. The non-transitory computer-readable medium of claim 18, wherein the one or more instructions, that cause the device to selectively use the one of the first option or the second option, cause the device to:
alternatively use the first option or the second option to determine the MIMO configuration when the first SINR value is included in the range of SINR values.

20. The non-transitory computer-readable medium of claim 15, wherein the one or more instructions, when executed by the one or more processors, further cause the device to:
determine a transmission power value of a transmission power associated with the UE, after transmitting the second data to the UE;
selectively use the first option or the second option to redetermine the MIMO configuration, based on the transmission power value,
wherein the first option is used to redetermine the MIMO configuration when the transmission power value does not satisfy a threshold transmission power value, and
wherein the second option is used to redetermine the MIMO configuration when the transmission power value satisfies the threshold transmission power value; and
transmit additional data to the UE using the redetermined MIMO configuration.

* * * * *